US010179656B2

(12) United States Patent
Janek et al.

(10) Patent No.: US 10,179,656 B2
(45) Date of Patent: Jan. 15, 2019

(54) AIRCRAFT THIEVERY PROTECTION APPARATUS AND METHODS

(71) Applicants: Walter Janek, Boyton Beach, FL (US); Michael Allen Longfellow, Reynoldsburg, OH (US)

(72) Inventors: Walter Janek, Boyton Beach, FL (US); Michael Allen Longfellow, Reynoldsburg, OH (US)

( * ) Notice: Subject to any disclaimer, the term of this patent is extended or adjusted under 35 U.S.C. 154(b) by 184 days.

(21) Appl. No.: 14/999,808

(22) Filed: Jun. 30, 2016

(65) Prior Publication Data

US 2017/0117658 A1    Apr. 27, 2017

Related U.S. Application Data (60) Provisional application No. 62/285,252, filed on Oct. 23, 2015.

(51) Int. Cl.
| H01R 13/44 | (2006.01) |
| B64D 45/00 | (2006.01) |
| H01R 13/639 | (2006.01) |

(52) U.S. Cl.
CPC ..... B64D 45/0015 (2013.01); H01R 13/6397 (2013.01)

(58) Field of Classification Search
CPC .................................................. H01R 13/6397
USPC .................................................. 439/133, 134
See application file for complete search history.

(56) References Cited

U.S. PATENT DOCUMENTS

| 3,826,115 A | 7/1974 | Davis |
| 4,754,627 A | 7/1988 | Butler, III |
| 5,277,599 A | 1/1994 | Nilson |
| 5,417,541 A | 1/1995 | Calio |
| 5,573,412 A | 11/1996 | Anthony |
| D386,149 S * | 11/1997 | Malone, Sr. .................. D13/156 |
| 6,676,421 B1 * | 1/2004 | Bynes ................ H01R 13/6397 439/134 |
| 6,997,724 B2 | 2/2006 | Earl |
| 7,271,337 B2 * | 9/2007 | Le Mon ............. H01R 13/6397 174/135 |
| 7,677,065 B1 * | 3/2010 | Miao ....................... E05B 37/02 439/133 |

* cited by examiner

Primary Examiner — Tho D Ta (57) ABSTRACT

An aircraft theft protection apparatus has two mating parts that encapsulates an electrical power connecter when the electrical power connector is removed from the aircraft's electrical power source. When the electrical power connector is removed the electrical power to the aircraft is interrupted preventing the aircraft from starting its engines. When the two mating parts are fitted together a unique space is provided which allows the electrical power connector to fit closely therein, which is a first theft prevention apparatus. When the electrical power connector is encapsulated within the inventive locking apparatus, a pin-like lock having a non-duplicating key locks the two mating parts together which again prevents the electrical power connector to be reconnected to the aircraft's electrical power source.

9 Claims, 7 Drawing Sheets

AIRCRAFT THIEVERY PROTECTION APPARATUS AND METHODS

BACKGROUND OF THE INVENTION a. Field of the Invention

This invention relates in general to the field of preventing aircraft theft. It is known that most aircraft thievery occurs while the aircraft is on the ground. The present invention is therefore in particular related to preventing theft when the aircraft is on the ground by disabling the aircraft's electrical power source. An interface electrical power connector connects the electrical power source to the aircraft thereby enabling the aircraft's electrical power source and allows the aircraft to start its engines. Thus, the aircraft's electrical power source is disabled by disconnecting the electrical power connector and by preventing the reconnection of the same this manner the aircraft cannot be powered up and cannot be stolen.

b. Description of the Prior Art

Aircraft thievery is more common than most people realize. It can happen many ways e.g.: in the air; on the ground; while the aircraft is taxiing for a take-off; while the aircraft is in a hanger; or, while on the tarmac; to mention some but not all the ways an aircraft can be stolen. Thieves are extremely uncanny and inventive when it comes to stealing a plane.

A major concern is large planes with an empty weight of over 12,500 pounds. Because of their size and weight and with a full load of fuel they are considered potential flying bombs. As such they can create a large amount of damage if used for malicious purposes. Known ways to steal a large plane are the use of an enabled electrical power connector (i.e. one that is not disconnected from the electrical power source) or simply reconnecting the electrical power connector which has been removed but not otherwise protected. As expected leaving the electrical power connector connected to the electrical power source, while against protocol, occurs all too often.

One prior art attempt to prevent theft of large planes is the use of "Medeco"® locks to lock the electrical power connecter to the electrical power source. Medeco® locks are essentially "burglar" proof and they are a good start to prevent theft.

Applicant is aware of only one prior art patent that indirectly concerns the subject matter of this application, i.e. U.S. Pat. No. 6,997,724 B2 entitled "Aircraft Battery Lockout Device: by Ronald J. Earl, issued Feb. 14, 2006 (hereinafter the "724" patent). In one embodiment of the '724 patent the electrical power connector is removed and replaced by a key lock-out device comprising a cover over the electrical power receptacle which further utilizes ball bearings and a cam lock. In a second embodiment the electrical power connector is removed and locked into a device which uses a key and ball bearings to lock and unlock the electrical power connector. Thus, the lock-out ability of the '723 patent relies on keys and ball bearings in conjunction with a camming detent. Both embodiments of which can be overcome by the use of sufficient force and cunning to overcome the ball bearing-detent lock-out apparatus. Moreover, both embodiments involve relatively complicated mechanisms which make the application of said devices inconvenient to use.

While the current use of Medeco® locks has had the effect of reducing aircraft thefts they are not sufficient as a solution in and of themselves.

What is needed is an aircraft main electrical connector locking apparatus that is simple in construction and easy to be used and which prevents the aircraft from powering up and be stolen. The present invention provides an electrical power connector locking apparatus which uniquely encapsulates a removed electrical power connector and is essentially burglar proof and which effectively prevents a would be thief from stealing the aircraft even if the locked out electrical power connector is left within the aircraft. The present invention accomplishes this goal,

SUMMARY OF THE INVENTION

The present invention comprises apparatus that includes an enclosure (which may be termed as a locking apparatus) for fitting therein a removed aircraft electrical power connector. Removal of the electrical power connector from the aircraft's electrical power source prevents an aircraft's engines from starting; in this manner the removal of the electrical power connector disables the aircraft. A first theft deterrent is created when the electrical power connector is removed and is uniquely inserted in a specially constructed enclosure or apparatus comprising two mating members. A second theft deterrent preferably comprises the use of a pin-like lock that connects the two mating members of the locking apparatus and prevents removal of the encapsulated electrical power connector.

The simple but unique enclosure or locking apparatus only comprises two mating members. Said locking enclosure or apparatus is created when the two members of the inventive locking apparatus are fitted together. The mating members are specially designed to fit one within the other in a unique manner while encapsulating the electrical power connector along with attached electrical cables and (not shown) "prongs" that electrically connect the electrical power connector to the electrical power source of the aircraft. Once enclosed within the locking apparatus, the electrical power connector cannot be removed either in a side to side direction or a front to rear direction and cannot be removed from the locking apparatus.

A first cavity encloses the sub portion of the electrical power connector. A second cavity directly under the first cavity encompasses a shaft of the electrical power connector. The main body of the electrical power connector is contained by a pair of oppositely arranged flanges located at a top of the locking apparatus. A uniquely configured lip at the rearmost end of the outer member fits closely around a semi rounded end of the inside member securely prevents removal in a rear to front direction. The front to rear direction (or vice versa) is also prevented by the first and second cavities as well as the locking apparatus itself. The side to side direction is prevented by the first and second cavities.

Finally, aligned holes between in the two mating members is fitted with a pin-like lock. The unique configuration of the two mating members prevents an uninformed or unauthorized person not generally familiar with the locking apparatus from disengaging the two mating members even without the pin-like lock. However, the addition of a pin like lock absolutely prevents unauthorized removal of the electrical power connector, and of course, the theft of the aircraft.

BRIEF DESCRIPTION OF THE DRAWINGS

FIG. 3 is a cross sectional view of the inventive electrical power connector taken along the line 3-3 of FIG. 2 showing how a first member of the locking apparatus fits within a second member and illustrates in phantom the electrical power connector as it is fitted to the locking apparatus;

DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description operation, and advantages of the invention.

Figure 1:
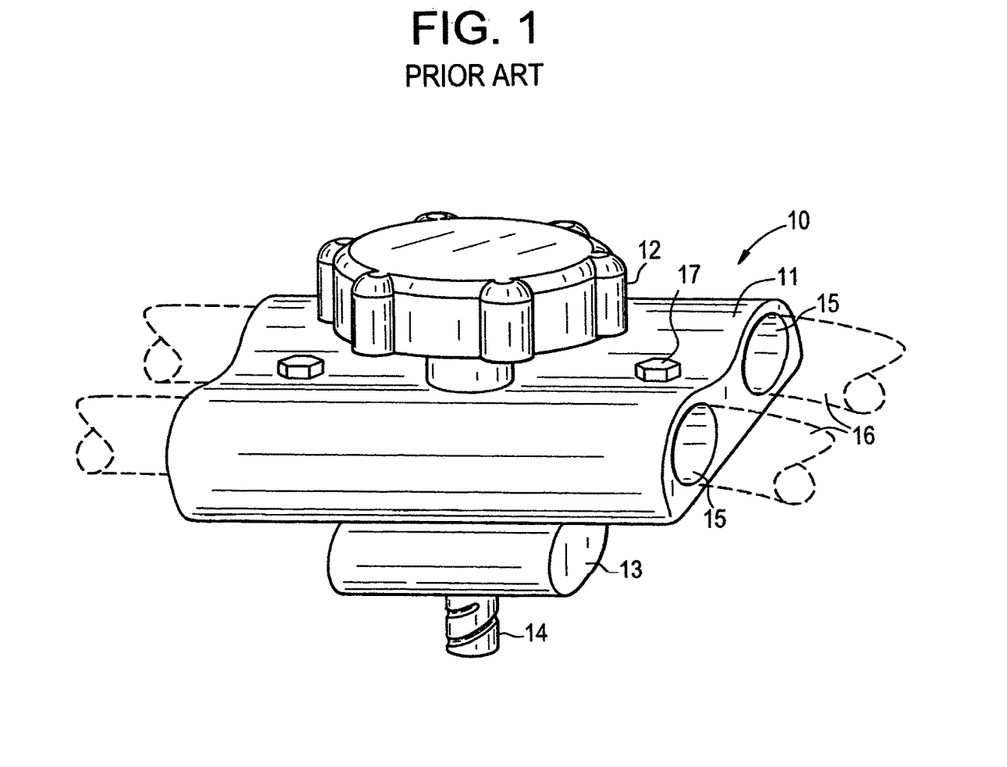
FIG. 1 is a schematic illustration of a typical prior art aircraft electrical power connector.

Referring now to FIG. 1 of the drawings there is depicted therein an isometric illustration of a typical prior art aircraft electrical power connector 10. The electrical power connector 10 includes a base or body portion 11, a knob 12 connected at the top of the base 11, and a subbase portion 13. A shaft 14 extends from the sub base of the electrical power connector 10 that fits within and locks the electrical power connector to the electrical power source (not shown). Rotation of the knob 12 rotates the shaft 14 and locks it the electrical power connector in place within the electrical power source. When the shaft 14 is locked within the aircraft's electrical power source, the aircraft is electrically connected (not shown) to the electrical power source and the aircraft can be powered up ready for takeoff. (Assuming, of course, that the required and proper protocol is used.) The base 11 contains through openings 15 which route power cables 16 that connect the electrical power source to the aircraft. The sub base 13 is configured to mate with a fitting of the electrical power source to assure correct connection of the electrical power connector and includes between the shaft or prong like members (not shown) which are interposed between the erical lectpower cables16 and the power source. The electrical power connector 10 can be split along its horizontal middle and joined together by bolts 17 for the purpose of aiding in the placement of the electrical power cables16

When the aircraft is shut down, a proper shutdown procedure requires that the electrical power connector 10 be removed from the electrical power source. Thus when the electrical power connector 10 is disconnected from the aircraft's electrical power source, the engines cannot be started and such comprises one aspect of an aircraft theft deterrent system. The electrical power connector 10 can be simply disconnected by rotation of the knob 12, but if not, and or if the electrical power connector 10 is disconnected but left in proximity near the electrical power source, it is a simple matter for a thief to steal the plane. The present invention necessarily requires the electrical power connector 10 to be disconnected from the aircraft electrical power source and enclosed in a locking apparatus in such a manner that the electrical power connector 10 cannot be reconnected to the electrical power source by an unauthorized person.

Figure 2:
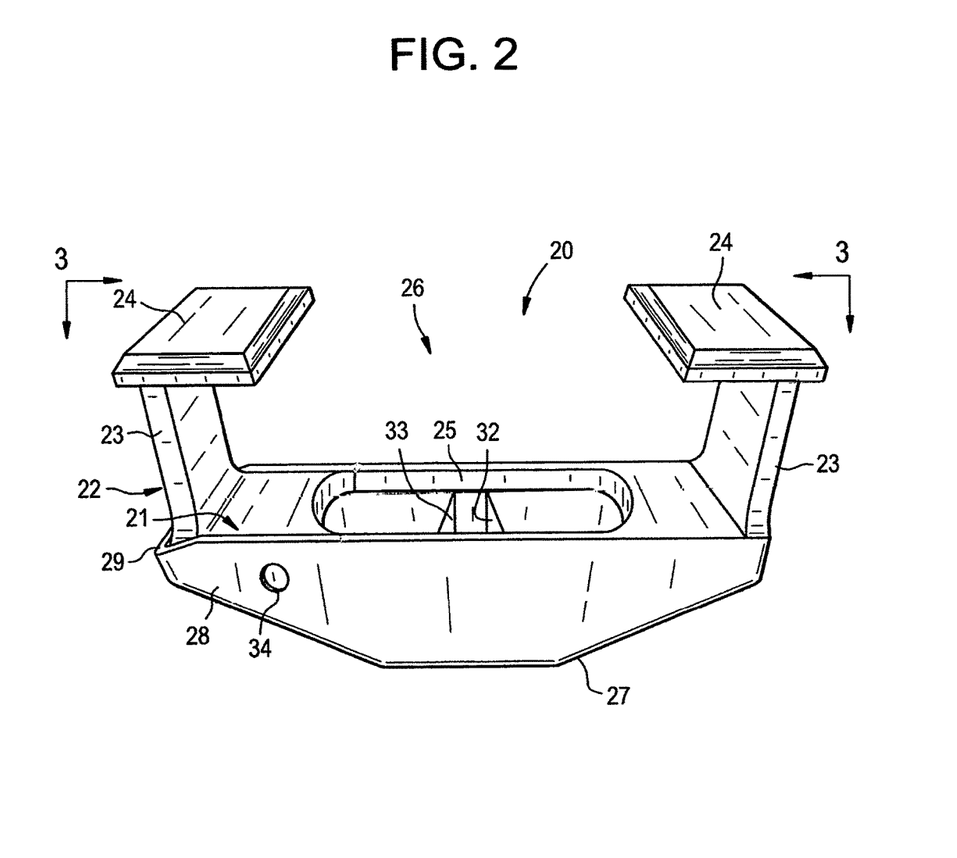
FIG. 2 illustrates the assembled inventive locking apparatus, without the electrical power connector contained therein; further details of which are illustrated in the following additional drawings.
Figure 5:
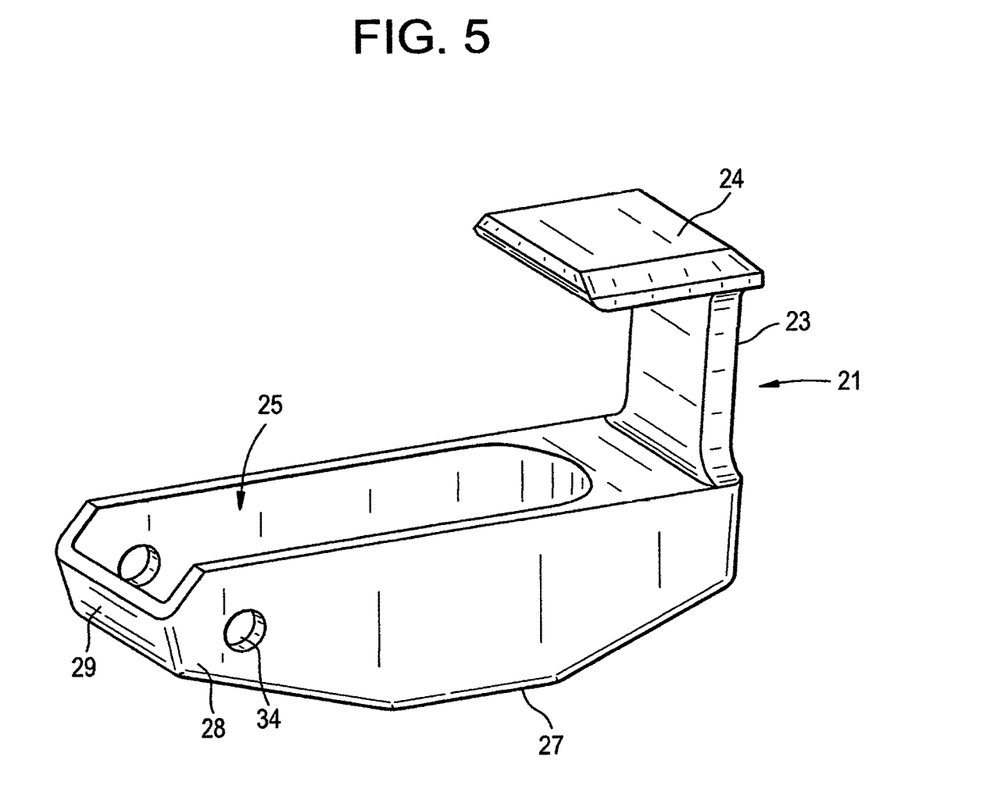
FIG. 5 illustrates a first member of inventive locking apparatus.
Figure 6:
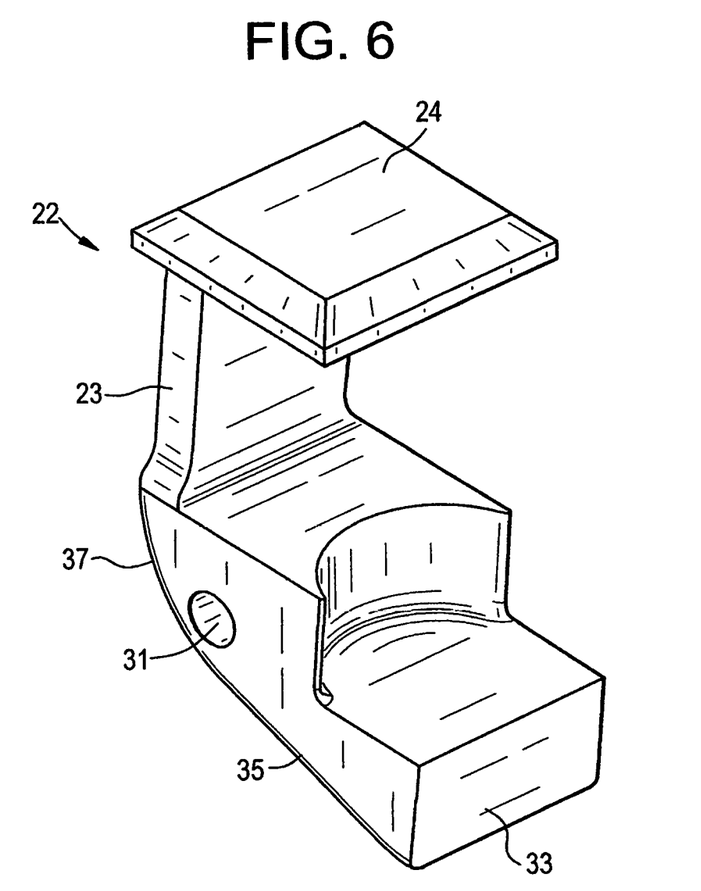
FIG. 6 illustrates second member of the inventive locking apparatus that fits within the first member; and, FIG. 7 shows an initial step of the method used to fit the first and second members together by angling the two members in order to clear a lip on the second member.

FIG. 2 shows the inventive electrical power connector locking apparatus 20 assembled without the electrical power connector 10 fitted therein. This view is being shown for the sake of clarity for understanding the assembly of and the fitting together of the two members 21 and 22 of the locking apparatus 20 (See also FIGS. 5 and 6 which show the individual members 21 and 22). Referring to FIGS. 2, 5, and 6, each member 21 and 22 includes an extending arm 23 and an inwardly projecting flange 24. A cavity or cutout 25 within the mating members 21 and 22 is configured to fit the subbase 13 while another cavity 38 fits the shaft 14. The space 26 between the extending arms 23 and under the flanges 24 within the assembled locking apparatus 20 closely fits there within the main body 11 of the electrical power connector 10 (see FIG. 4). Because of the unique method of assembling the locking apparatus 20 with the electrical power connector 10 therein, and due to the internal configuration of locking apparatus 20, an unauthorized person would not readily determine how to dissemble the locking apparatus 20 and remove the electrical power connector 10. A lip 29 at the outside end 28 of member 21 further maintains the fitting of members 21 and 22 and the electrical power connector 10 enclosed therein.

The electrical power connector 10 is usually made up in two halves that are separated about a horizontal axis of the body 11 of the electrical power connector. The two halves are then secured by bolts 17 located between the two cable openings 15. As noted above, the separable body 11 halves help in the insertion of the power cables 16. The flanges 24 of the locking apparatus 20 can cover the bolts 17 to prevent their removal and prevent unauthorized access to the electrical cables 16 at their electrical junction within the electrical power connector10.

Figure 3:
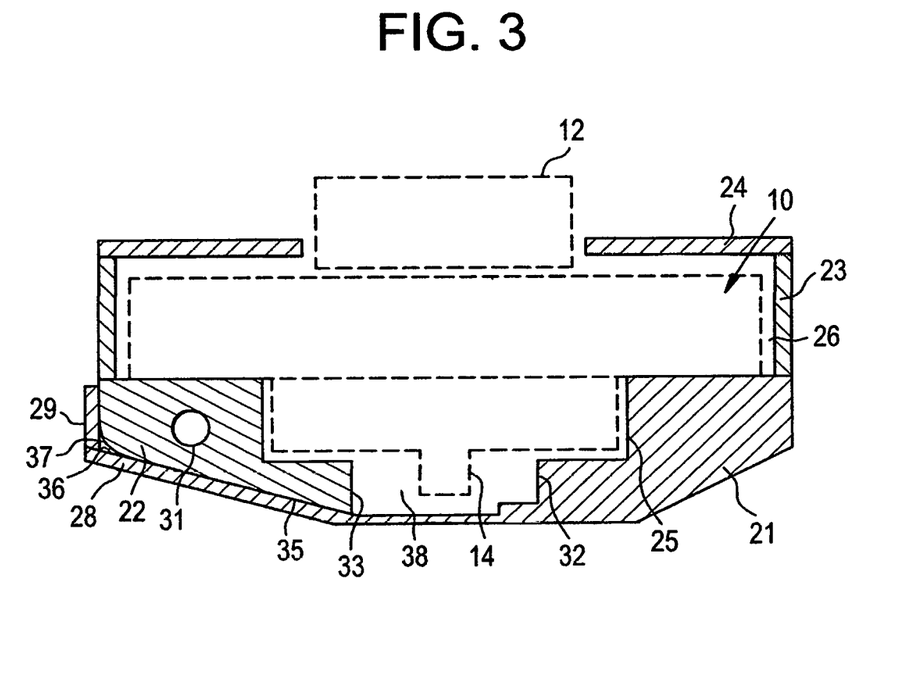
FIG. 3 illustrates the assembled inventive locking apparatus, with the electrical power connector contained as shown in phantom.

FIG. 3 is side cross sectional illustration of the apparatus of FIG. 2 taken along the line 3-3. FIG. 3 shows the side profiles of members 21 and 22 and the formation of the space 26 between the extending arms 23 (FIG. 2). Also shown is the cavity, cutout, or space 38 between the vertical ends 32 and 33 of members 21 and 22 which space 38 serves to fit therein the electrical power connector shaft 14 and any prongs (not shown) of the electrical power connector 10. As seen, the electrical power connector shaft 14 that extends down from the bottom of the electrical power connector 10 is also encompassed by the locking apparatus 20 and when so encased, the electrical power connector 10 cannot be connected to the aircraft's electrical power source. In other words, the electrical power connector 10 and the attached shaft 14 are fully captured (except for the knob 12) within the locking apparatus 20 and cannot be connected to the aircraft's electrical power source.

A through hole 34 in member 21 (see FIG. 2) when aligned with the through hole 31 in member 22 allows the fitting there through of in a pin-like lock. The pin-like lock as known in the prior art essentially comprises a shaft having flange 39 at each end thereof wherein one or both of the flanges 39 include a Medeco® locking mechanism.

Figure 4:
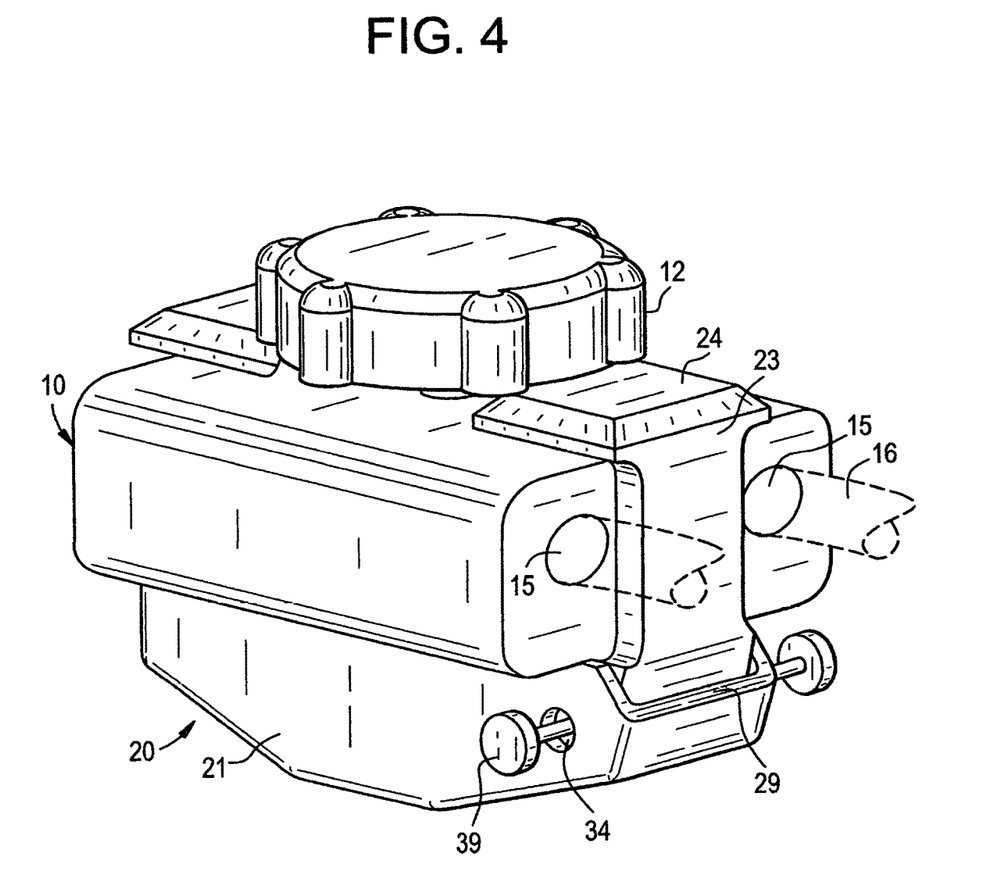
FIG. 4 depicts the electrical power connector encapsulated within the locking apparatus with the further anti theft means of pin like lock.

FIG. 4 shows the inventive locking apparatus 20 with the aircraft's electrical power connector 10 fitted within the inventive locking apparatus 20. Here it can be seen how the locking apparatus 20 is seriously compact and almost completely surrounds the electrical power connector 10. FIG. 3 illustrates how the member 22 fits within member 21 and the end of member 22 abuts against lip 29. The holes 31 and 34 are aligned when the locking apparatus 20 encloses the electrical power connector 10 as shown in FIG. 4. The aligned holes 34 and 31 are configured to fit therein a pin-like lock 39 which absolutely prevents the electrical power connector from being removed from the locking apparatus 20 by an unauthorized person. The pin-like lock 39 may be of the type such as a Medeco® that prevents the key from being duplicated or the internal locking mechanism from being "picked". The pin-like lock 39 may also be of a type that opens and closes by a remote device that emits a coded electrical signal.

FIGS. 5 and 6 show the details of one configuration of the members 21 and 22 of the locking apparatus 20. As seen in FIGS. 5 and 6 the inside configuration of member 21 is configured to fit fairly closely to the outside shape of member 22 and such that the members 21 and 22 fit or mate together as seen in FIGS. 2 and 3. When such mating is accomplished the space 26 (FIG. 2) under the flanges and within the locking apparatus 20 closely approximates that of the body 11 of the electrical power connector 10. The cavity 25 (FIG. 2) encompasses the subbase 13 and the electrical power connector shaft 14. Thus, when the electrical power connector 10 is fitted within the locking apparatus 20, the electrical power connector 10 is virtually encapsulated by locking apparatus 20, and cannot be connected to electrical power source.

Also seen in FIG. 5, is that the end 28 of member 21 includes an upwardly extending lip 29 which is intended to and does fit around the semi-rounded end 37 of member 22 when the electrical power connector 10 is fitted within the locking apparatus 20 (see FIGS. 2, 3 and 4). The lip 29 aids in maintaining the members 21 and 22 in a front to rear direction which additionally maintains the encompassed electrical power connector 10 in a front to rear direction while the flanges 24 maintain the electrical power connector 10 in an downward direction. This is not to imply or suggest that the other aspects of the configuration of members 21 and 22 play no part in encompassing the electrical power connecter and preventing the electrical power connector 10 from being reinserted or reconnected to the electrical power source. It is the total unique configuration of the members 21 and 22 that function together in securing removed electrical power connector 10. For example the cavity 25 between members 21 and 22 when mated together provides the space to fit the subbase 13 within the cavity 25; and vertical ends 32 and 33 of members 21 and 22 provide a space there between for the shaft 14. From the bottom inside surface of lip 29, the surface 35 of member 21 slopes downward and coincides with sloped bottom surface 36 of member 22. This is seen more clearly in FIG. 3. The sloped surfaces 35 and 36 serve to assist the insertion of member 22 into the locking apparatus 20 when the electrical power connector 20 is fitted within the locking apparatus 20.

Figure 7:
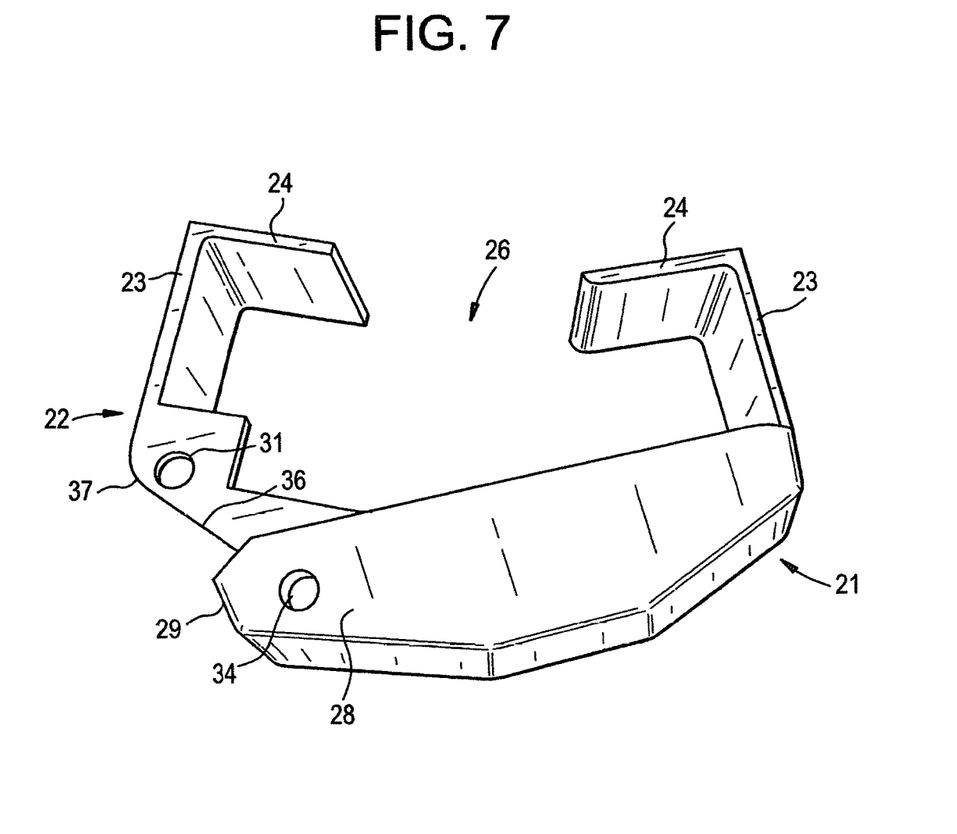

FIG. 7 comprises a view of members 21 and 22 at the beginning of the unique method of assembling the locking apparatus 20 (without the electrical power connector 10 being shown for purposes of clarity) such that all of the above mentioned configurations come together at the same time and result in the encompassed electrical power connector as seen in FIG. 4. As seen, member 22 is being inserted into end 28 of member 21 and such that each are slightly angled relative to each other and (the flanges and the extending arms necessarily being also slightly angled to each other). It is to be noted that should the electrical power connector 10 be fitted within the space 26 (FIG. 2) further insertion of member 22 may result in a slight interference with lip 29 requiring a small amount of force to fully insert member 22 within the cutout portion 37 in member 21. The slight amount of interference would exist because of the need to clear the lip 29 and simultaneously fit together the slopes 35 and 36. Such interference actually benefits the invention by providing a snug fit of the electrical power connector 10 when assembled within the locking apparatus 20. When member 22 is fully inserted the configuration of FIG. 3 results. When members 21 and 22 are assembled along with the electrical power connector 10, the configuration of FIG. 4 results.

The previously mentioned interference functions to provide a simple geometric locking feature which in practice can assist in preventing the enclosed electrical power connector 10 from being removed from the locking apparatus 20 without the use of a pin-like lock. In other words, to remove the enclosed electrical power connector a positioning force and angling in reverse to the assembly positioning force (see FIG. 7) must be used to separate members 21 and 22. Such subtle maneuvering would not be obvious to an unauthorized person.

In operation, upon landing an aircraft and shutting down the engines and the electrical power system, the pilot (or other designated person) rotates the knob that mechanically disconnects the electrical power connector from the electrical power source with the electrical cables in place within the electrical power connector 10. The electrical power connector 10 is then inserted within the locking apparatus 20 as described above and further secured by a pin-like locking device that fits within aligned holes 33 and 34 in the assembled locking apparatus 10. Since the electrical power connector cannot be connected to the electrical power source, the locking apparatus and the electrical power connector may be left in the aircraft and still prevent theft of the aircraft. The non-duplicating key, if used, can be carried by a responsible person such as the pilot in the same manner as one would carry his or her car or house keys. When it is time to use the aircraft in flight, the responsible person simply unlocks the pin-like lock, removes the electrical power connector and reconnects it to the electrical power source. The locking apparatus is then stored in an appropriate place for further use. In accordance with the present invention, the locking and unlocking of the electrical power connector and thus the respective disabling and reenabling the electrical power source of the aircraft is very reliable, simple, and compact.

While the invention has been described, disclosed, illustrated and shown in certain terms or certain embodiments or modifications which it has assumed in practice, the scope of the invention is not intended to be nor should it be deemed to be limited thereby and such other modifications or embodiments as may be suggested by the teachings herein are particularly reserved especially as they fall within the breadth and scope of the claims, drawings and description of the invention here appended.

We claim:

1. Locking apparatus for a removed aircraft's electrical power connector comprising:
   a first and a second members, said first and said second members being fitted together with said second member fitted within said first member, each of said first member and said second member having a flange attached to an end of an extending arm thereof, said flanges extending toward each other with a horizontal space between ends of said flange and a vertical space thereunder, said fitted together first and said second members forming a first and a second cavities there between, said first cavity being an being an upper cavity and said second cavity being a lower cavity.

2. The apparatus of claim 1 wherein said flanges have a vertical and horizontal spaces thereunder, said space under said flanges being above said upper cavity.

3. The apparatus of claim 2 wherein said fitted together first and second members form a cavity therebetween, said cavity fitting therein a subbase portion of said removed electrical power connector.

4. The apparatus of claim 2 including aligned openings between said first and second fitted together members, and a pin-like lock fitted within said aligned openings.

5. The apparatus of claim 2 wherein said first member includes a lip extending upwardly from a bottom of an end of said first member and said second member includes a semi rounded end, said lip extending around said semi rounded end.

6. The apparatus of claim 5 wherein said semi rounded end curves downwardly and inwardly toward a bottom surface of said second member and merges into a first downwardly sloped bottom surface of said second member and said first member includes a second downwardly sloped surface that fits against said first sloped surface with the body portion of said electrical power connector fitted and being held there within.

7. Locking apparatus adapted to lock an aircraft's electrical power connector within said locking apparatus wherein said electrical power connector has been removed from an electrical power source of an aircraft, said electrical power connector including a body portion, a knob extending from said body portion, and a subbase portion extending downward from said body portion, said removed electrical power connector having electrical cables connected thereto, said locking apparatus including:

a first member and a second member, said second member fitted within said first member, an upwardly extending arm attached to each of said two members, a flange attached to an end of each of said upwardly extending arms, said flanges extending away from said upwardly extending arms, and a first horizontal space between ends of said flanges, said horizontally spaced flanges having a first vertical and a second horizontal spaces under said flanges, said body portion of said electrical power connector fitting in said spaces under said flanges, and said knob fitting above said flanges, each of said upwardly extending arms having an opening therethrough with said connected electrical cables in said electrical power connector, extending through said openings in said first and second members.

8. The apparatus of claim 7 wherein said upwardly extending arms of said first and second members include said openings therethrough, said connected electrical cables extending outward through said openings in each of the two upwardly extending arms.

9. A method adapted for assembling a locking apparatus for an aircraft electrical power connector that has been removed from the electrical source of an aircraft, said electrical power connector having a body, a knob extending upward from said body, a subbase extending down from said body, and electrical cables connected to said body and extending out from said body, said locking apparatus comprising a first member and a second member, said second member fitting within said first member, each said first member and said second member having a bottom end, an arm extending up from each of said bottom ends, and an inwardly directed flange attached to an end of each of said arms, said first member having an upwardly extending lip at said bottom end of said first member, said second member having a semi rounded end, comprising the steps of:

placing the body portion of the electrical power connector under the inwardly directed flanges, and between said arms of said first member and said second member, extending said connected electrical cables through each said first member and said second member of said locking apparatus, slightly angling said first member and said second member relative to each other, bringing said second member in contact with said upwardly extending lip of the first member, inserting said semi rounded end of said second member over said upwardly extending lip of the first member, and fully inserting said second member into said first member.

* * * * *